Jan. 31, 1967    O. J. SCHWERTFEGER ET AL    3,301,442
PRODUCT DISPENSING DEVICE
Filed March 24, 1965    4 Sheets-Sheet 1
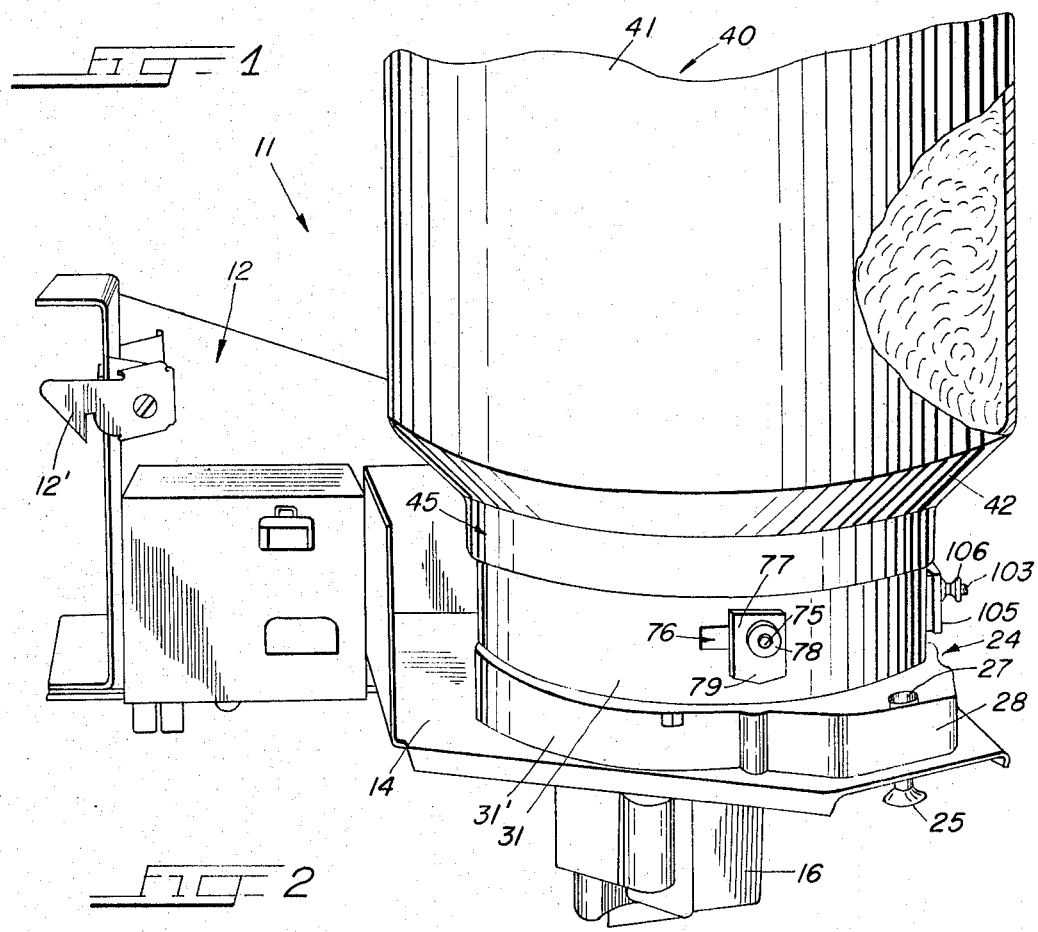
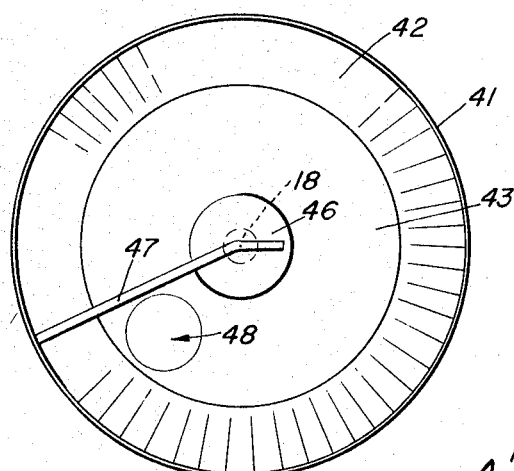
INVENTORS.
OWEN J. SCHWERTFEGER
FRANK D. BRILL
BY
ATTY.

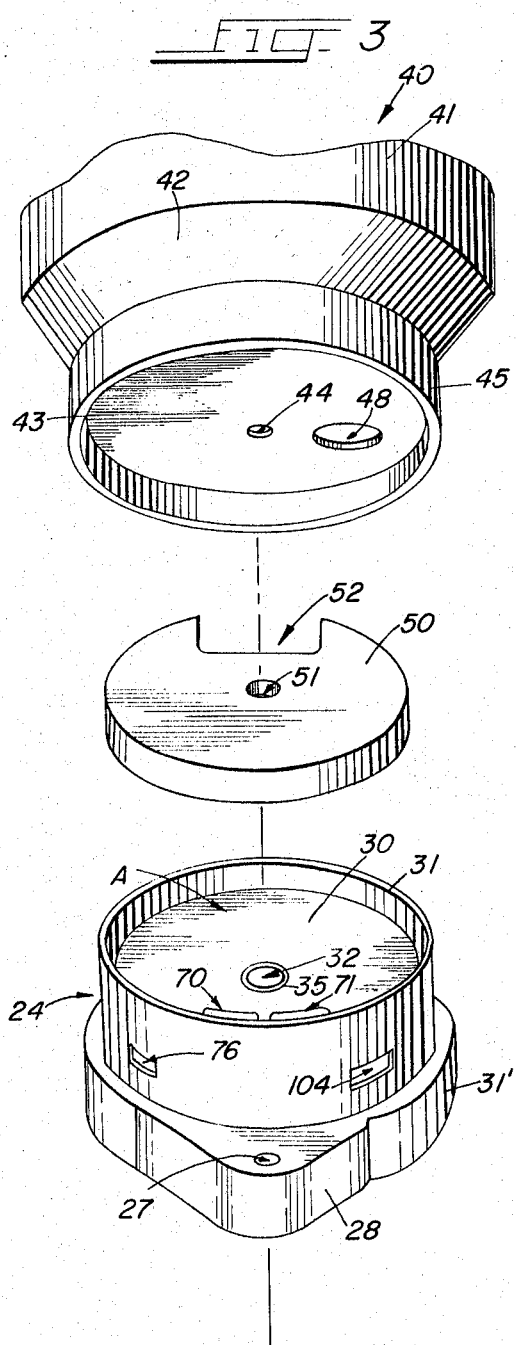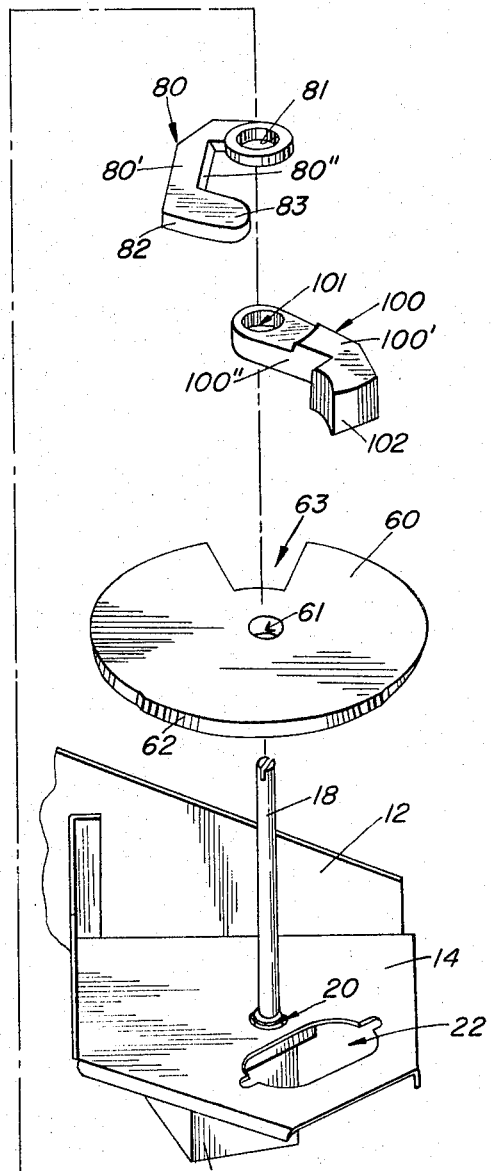

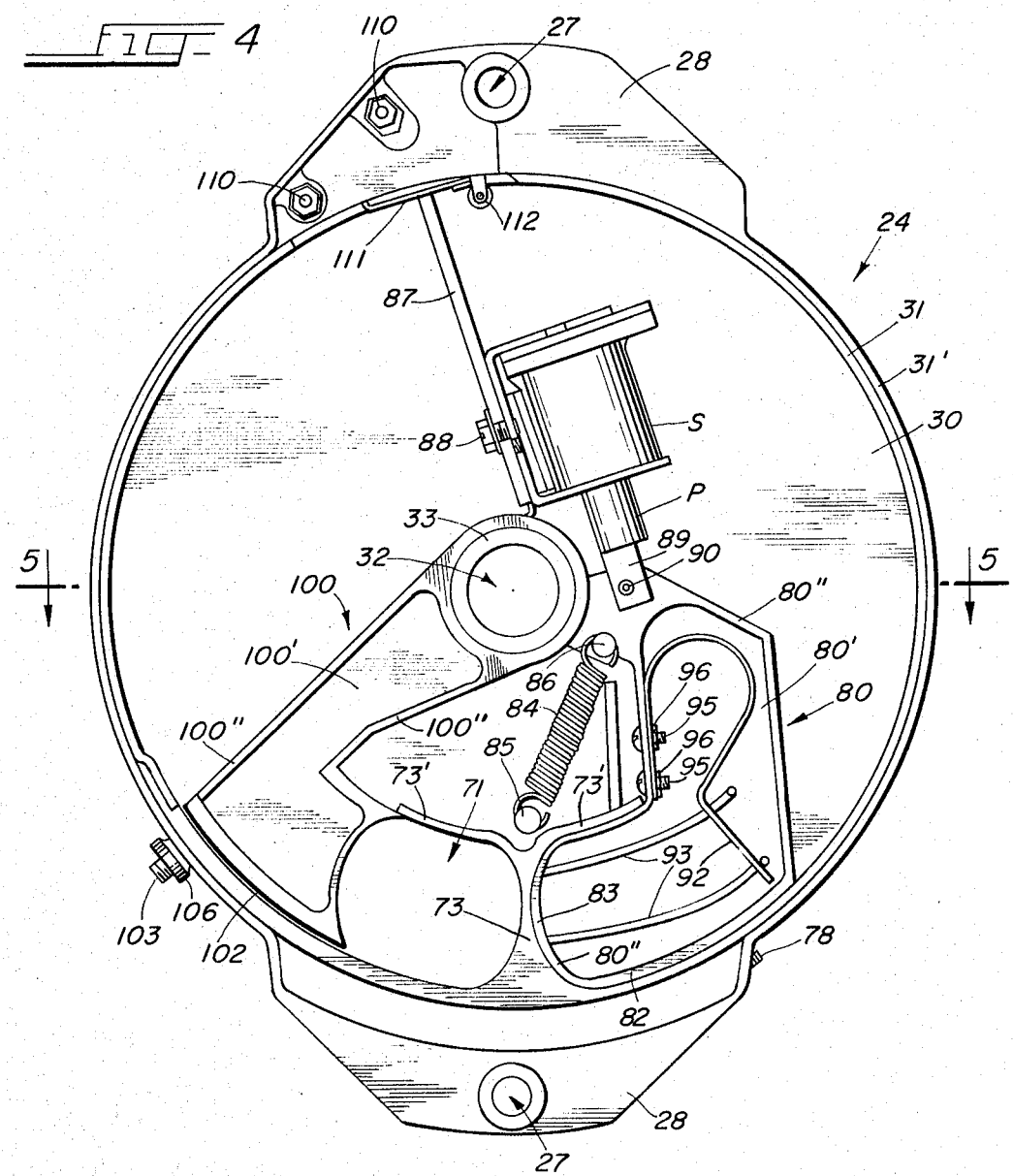

Jan. 31, 1967　　O. J. SCHWERTFEGER ET AL　　3,301,442
PRODUCT DISPENSING DEVICE
Filed March 24, 1965　　　　　　　　　　　　　　4 Sheets-Sheet 4
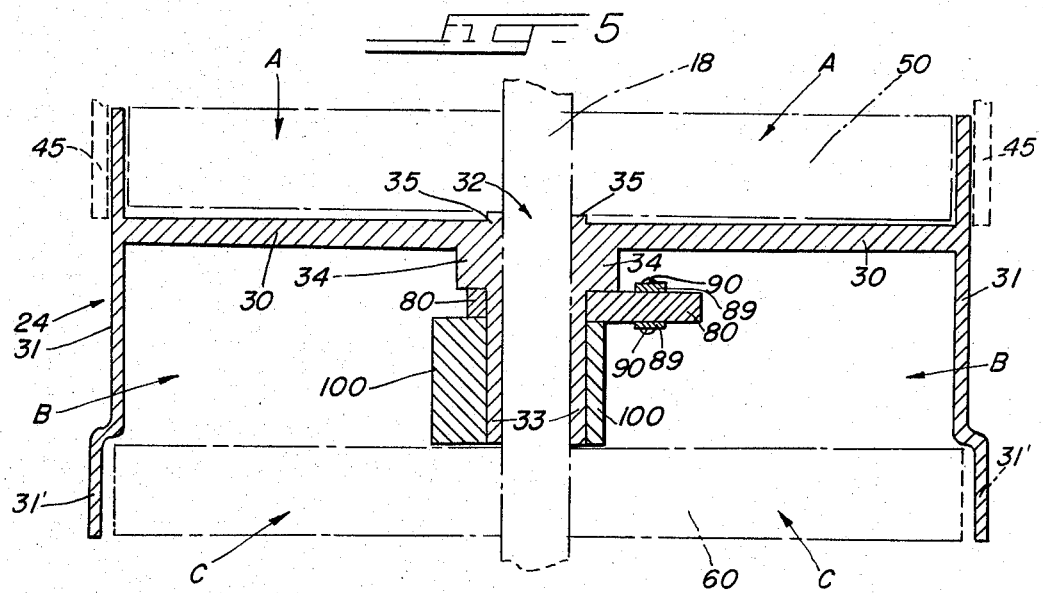
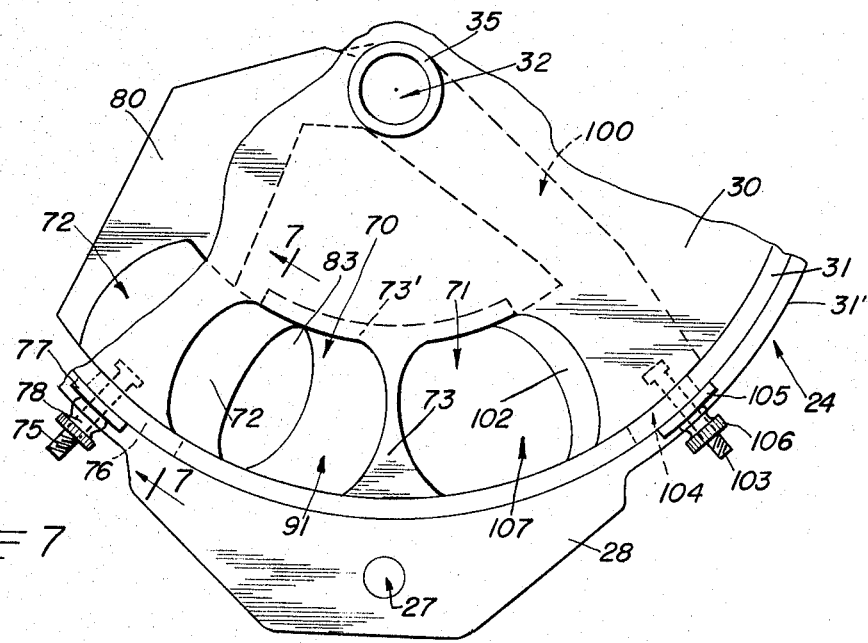
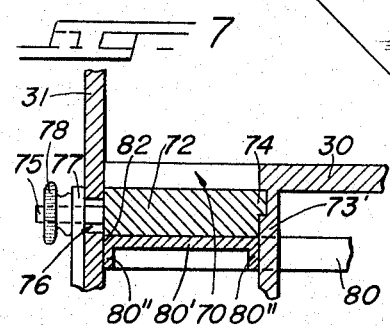
INVENTORS.
OWEN J. SCHWERTFEGER
FRANK D. BRILL
BY
ATTY.

United States Patent Office 3,301,442
Patented Jan. 31, 1967

3,301,442
PRODUCT DISPENSING DEVICE
Owen J. Schwertfeger, Chicago, and Frank D. Brill, Norridge, Ill., assignors to The Seeburg Corporation, Chicago, Ill., a corporation of Delaware
Filed Mar. 24, 1965, Ser. No. 442,309
7 Claims. (Cl. 222—252)

This invention relates to dispensing mechanisms and more particularly to a device adapted to dispense a predetermined metered amount of a dry powdered or granulated product such as ground coffee.

Broadly described, the subject invention comprises means for storing a dry powdered or granulated product; means defining a dispensing chamber adapted to hold a predetermined metered amount of such dry product; means for releasing the predetermined metered amount of such product from the dispensing chamber; and means for transporting dry product from the storage means to the dispensing chamber in a manner such that the dispensing chamber is refilled with dry product after the predetermined metered amount of such product is dispensed therefrom. In accordance with the subject invention, means are provided for varying the effective volume of the dispensing chamber in order to predetermine the metered amount of product that is dispensed.

Preferably, the subject invention further comprises means defining a second dispensing chamber adapted to hold a second predetermined metered amount of such dry product in addition to the first amount and means, operable at the option of the user, for releasing the second predetermined amount from the second dispensing chamber, whereby the user has the choice of obtaining either the first amount or a larger amount in the form of a combination of the first and second amounts. The said transport means is further adapted to replenish the supply of such product in the second dispensing chamber after the release of product therefrom. According to the preferred embodiment of the subject invention, means are also provided for adjusting the respective volumes of each of the two dispensing chambers whereby the predetermined metered amounts of dry product may be varied in size.

The need for an apparatus capable of fast delivery and accurate measurement of ground coffee developed with the innovation of rapid cycle, one-cup coffee brewing vending machines. In order to obtain greater versatility with such coffee brewing machines, it is desirable that the amount of ground coffee delivered be adjustable so that the machine may be used with ground coffee of different quality or in order that the strength of the coffee ultimately brewed may be varied. Moreover, it is also desireable to provide for variation in the amount of coffee delivered for the brewing of an individual cup of coffee having "regular" strength or having "extra strong" strength, in response to individual customer preference. The subject invention was developed in order to provide a dispensing mechanism with these operational characteristics. However, the mechanism as hereinafter described is suitable for dispensing many dry products other than ground coffee.

Accordingly, it is a primary object of the present invention to provide a dispensing device adapted to dispense a predetermined metered amount of dry powdered or granulated products, such as ground coffee.

Another object of the present invention is to provide a device of the character described in which the predetermined metered amount of dispensable dry product is adjustable.

A further object is to provide a device of the character described which, at the customer's option, is adapted to dispense extra predetermined metered amounts of dry product in addition to the normal amounts.

Yet another object is to provide a device of the character described in which the dry product is rapidly dispensed, yet in which the predetermined metered amount of such product to be dispensed is accurately measured.

These and other objects, advantages, and features of the subject invention will hereinafter appear, and, for purposes of illustration, but not of limitation, an exemplary embodiment of the subject invention is illustrated in the drawings, in which:

FIGURE 1 is a perspective view of an embodiment of the subject invention adapted to dispense ground coffee, with the coffee canister portion thereof partially broken away;

FIGURE 2 is a top plan view of the coffee canister portion of the embodiment shown in FIGURE 1;

FIGURE 3 is an exploded perspective view of the embodiment shown in FIGURE 1;

FIGURE 4 is a bottom view of the base assembly portion of the embodiment shown in FIGURE 1;

FIGURE 5 is a sectional view taken along line 5—5 in FIGURE 4;

FIGURE 6 is a fragmentary plan view of the base assembly portion shown in FIGURE 4; and FIGURE 7 is a sectional view taken along line 7—7 in FIGURE 6.

With reference to the drawings, FIGURE 1 shows a coffee dispenser 11 adapted to be mounted, for example, in a coffee brewing and dispensing machine (not shown) by means such as a mounting bracket 12, having a retaining member 12' pivotally mounted thereon. A supporting shelf 14 is fixed by conventional means to mounting bracket 12 (see FIGURES 1 and 3). A motor 16 is mounted beneath supporting shelf 14, and a drive shaft 18 is coupled to motor 16 and extends upward through an opening 20 in supporting shelf 14. A slot 22 is provided in shelf 14 (see FIGURE 3) for reasons that will hereinafter appear.

A base structure 24 is mounted on the supporting shelf 14 by a pair of threaded fasteners 25, each of which passes through an opening 26 in shelf 14 and is threaded into an opening 27 in one of a pair of projecting flanges 28 of base structure 24. As may best be seen in FIGURE 5, base structure 24 comprises a generally horizontal flat disk 30 and a tubular cylinder 31 preferably formed integrally with disk 30. The lower portion 31' of cylinder 31 is offset outwardly so as to have a slightly greater diameter than cylinder 31, for reasons that will hereinafter appear. A centrally disposed collar 33 having a shoulder 34 formed thereon projects downwardly from disk 30 and an opening 32 is centrally formed in disk 30 through collar 33. Another collar 35 having the same diameter as opening 32 projects upwardly from disk 30, for a reason that will hereinafter appear.

The generally open interior portion of the previously described base structure 24 is thus formed into three separate and distinct sections, A, B, and C. Section A is that portion lying inside cylinder 31 and above disk 30, section B is that portion lying inside cylinder 31, below disk 30, and above lower portion 31' of cylinder 31, and section C is that portion lying inside lower cylinder portion 31' beneath section B. As will hereinafter appear, section A functions as a coffee transfer section, section B as a coffee metering section, and section C as a coffee releasing section.

The lower cylinder portion 31' of base structure 24, from which projecting flanges 28 extend, is adapted to abut against supporting shelf 14 in a manner such that drive shaft 18 extends upwardly in opening 32 through collar 33. The diameter of drive shaft 18 is such that it may freely turn within collar 33. Drive shaft 18 is shown in broken lines in FIGURE 5.

A canister 40 is provided for storing the ground coffee to be dispensed by dispenser 11 (see FIGURES 1–3). Canister 40 comprises a generally cylindrical upper body 41 and an inwardly tapered lower body 42. A generally flat bottom 43, provided with a central opening 44, is preferably formed integrally with the lower edge of lower body 42. A projecting cylindrical collar 45 is also formed integrally with the edge of lower body 42 (see FIGURE 3), and the inside diameter of collar 45 is slightly greater than the outside diameter of cylinder 31, whereby collar 45 may be fitted over cylinder 31 so as to fixedly mount canister 40 on base structure 24. Mounting collar 45 of canister 40 is shown in broken lines in FIGURE 5.

Opening 44 in bottom 43 is of such diameter that drive shaft 18 passes therethrough and is free to rotate. A circular plate 46 is fixed to the upper end of drive shaft 18 adjacent the upper surface of canister bottom 43 (see FIGURE 2). The diameter of plate 46 is sufficiently large to prevent any of the ground coffee stored in canister 40 from accidentally moving downwardly between the edge of opening 44 and shaft 18 so as to incumber free rotation of shaft 18. A wire agitator 47 is fixed to plate 46 in a conventional manner, and the configuration of agitator 47 generally conforms to the lowermost radial contour of canister 40 (see FIGURE 2). Agitator 47 is adapted to move through and agitate the ground coffee stored in canister 40 as shaft 18 is driven by motor 16. It will be obvious to one skilled in the art that the rotation of shaft 18 in opening 44 in canister bottom 43 can be improved by providing a bearing (not shown) in said opening. It will also be obvious to one skilled in the art that a removable cover (not shown) may be provided in order to close the normally open top of canister 40 so as to prevent foreign objects or materials from contaminating ground coffee stored therein. A second opening 48, substantially larger than opening 44 (see FIGURES 2 and 3), is provided in bottom 43 adjacent the outer edge thereof for a purpose hereinafter to be explained.

A transport plate 50 (see FIGURE 3) is provided in section A of base structure 24, and plate 50 is adapted, by means of a central opening 51 formed therein, to be mounted on drive shaft 18 for rotation therewith. The lower edge of transport plate 50 is adapted to fit flush adjacent the upper edge of collar 35 which provides a bearing surface on which plate 50 may rotate. One portion of the outer edge of transport plate 50 is cut away to form a transport cavity 52. Cavity 52 is adapted, during rotation of plate 50, to periodically pass under opening 48 in canister bottom 43. In the assembled dispenser 11, the upper surface of transport plate 50 is positioned adjacent the lower surface of canister bottom 43, but is free to rotate without engaging canister bottom 43. Transport plate 50 is shown in broken lines in FIGURE 5.

A main drop plate 60 (see FIGURE 3) is provided in section C of base structure 24, and an opening 61 is formed centrally in drop plate 60 whereby plate 60 may be mounted on drive shaft 18 for rotation therewith. The diameter of drop plate 60 is greater than the inside diameter of cylinder 31 whereby ground coffee disposed in section B of structure 24 may not flow downwardly past the outer edge of plate 60. A cam surface 62 (see FIGURE 3) is formed along a portion of the outer edge of plate 60 for a purpose that will hereinafter be explained. Another portion of the outer edge of main drop plate 60 is cut away to form a product release cavity 63 (see FIGURE 3). Product release cavity 63 is positioned such that, when main drop plate 60 is driven by shaft 18, cavity 63 periodically passes over the previously described slot 22 in supporting shelf 14. Drop plate 60 is shown in broken lines in FIGURE 5.

A pair of openings 70, 71 are provided in disk 30 of base structure 24 (see FIGURES 3, 4, and 6). Openings 70, 71 are separated by a wall 73 (see FIGURE 6) which extends downwardly to a point adjacent the top of main drop plate 60. A similar downwardly extending wall 73' (shown in broken lines in FIGURE 6), preferably formed integrally with wall 73, is provided along the inner edges of openings 70, 71. The purposes served by walls 73, 73' will hereinafter appear. Openings 70, 71 are positioned such that transport cavity 52 in transport plate 50 passes over openings 70, 71 as plate 50 is rotatably driven by drive shaft 18. Openings 70, 71 are also aligned with the product release cavity 63 in main drop plate 60 as plate 60 is likewise rotatably driven by drive shaft 18.

A "regular" metering shutter 100 is provided (see FIGURES 3–7), and an opening 101 is formed in one end thereof, the diameter of opening 101 being such that shutter 100 may be mounted about collar 33 of disk 30 in section B (see FIGURE 5). The other end 102 of shutter 100 is adapted to partially extend beneath opening 71 in disk 30 so as to limit the effective area thereof. The outer edge 102 of shutter 100 is curved to conform to the inner diameter of cylinder 31 whereby, when shutter 100 is pivoted about collar 33, outer edge 102 is maintained adjacent the cylinder 31 (see FIGURE 4). Shutter 100 comprises a generally planar top 100' and downwardly extending side flanges 100" (see FIGURES 4 and 5). In this manner, shutter 100 extends downwardly to a point adjacent main drop plate 60.

A threaded shaft 103 is anchored in shutter 100 and extends through an opening 104 (see FIGURES 3 and 6) in cylinder 31 and a plate 105, which functions as a clamp and pointer (see FIGURES 1 and 6). When a nut 106 is tightened onto threaded shaft 103, plate 105 is held tightly against the outer surface of cylinder 31 whereby regular metering shutter 100 is fixed in a given angular position. However, when nut 106 is loosened, the angular disposition of shutter 100 may be adjusted by sliding threaded shaft 103 laterally in opening 104. Adjustment of the angular position of shutter 100 in turn varies the effective size of opening 71, since as hereinbefore explained, shutter 100 underlies a portion of opening 71. The lower edge of plate 105 is pointed and a marking scale is provided on the outside of cylinder 31 whereby shutter 100 may be located in predetermined positions.

The described transport plate 50, downwardly extending wall 73, wall 73', cylinder 31, regular metering shutter 100, and main drop plate 60 cooperate to define a regular metering shutter 100 in the previously described manner. be varied by adjusting the angular disposition of regular metering shutter 100 in the previously described manner. The function and operation of regular metering chamber 107 will hereinafter appear.

An "extra strong" metering shutter 72 (see FIGURES 6 and 7) is provided adjacent the lower surface of disk 30 beneath opening 70. A tongue 74 formed on metering shutter 72 is adapted to slidably move in a groove in wall 73', as shown in FIGURE 7. A threaded shaft 75 is fixed in and extends horizontally from the outer edge of metering shutter 72 through an opening 76 provided in cylinder 31 (see FIGURES 1, 3, 6, and 7). Shaft 75 also passes through a plate 77 which functions as a clamp and pointer, similarly to plate 105. A nut 78 is threaded onto shaft 75, and, when nut 78 is tightened, extra strong metering shutter 72 will be fixed in position. However, when nut 78 is loosened, the position of metering shutter 72 in opening 70 may be adjusted by sliding the threaded shaft 75 laterally in opening 76. In this manner, the effective size of opening 70 may be adjusted. As is the case with the previously described plate 105, the lower edge of plate 77 is formed into a point 79 (see FIGURE 1) which is adapted to move along a scale of markings provided on the outer surface of cylinder 31 so as to indicate externally the relative position of shutter 72 in opening 70.

An extra strong drop plate 80 is provided (see especially FIGURES 3 and 4). One end of drop plate 80 is provided with an opening 81 which is adapted to fit over collar 33 and between shoulder 34 and regular metering shutter 100 (see FIGURE 5). The other end 83 of plate 80 is curved to conform to the shape of the end of opening 70. The outer edge 82 of extra strong drop plate 80 is curved so as to conform to the inner surface of cylinder 31. Thus, when extra strong drop plate 80 is disposed in the position shown in FIGURE 4, plate 80 underlies opening 70 in disk 30. When, however, plate 80 is rotated in a counterclockwise direction as seen in FIGURE 4 (corresponding to clockwise rotation as seen in FIGURE 6), plate 80 moves out from under opening 70 (the effective size of opening 70 being determined by the position of extra strong metering shutter 72 as hereinbefore explained). For example, plate 80 is shown in its opened position in FIGURE 6. As may best be seen in FIGURES 4 and 7, plate 80 comprises a relatively thin planar top 80' and a downwardly extending side flange 80'' formed integrally therewith.

A wire form 92 (see FIGURE 4) is mounted beneath planar top 80' by means of a pair of rods 93, 94 and respective pairs of bolts 95 and nuts 96. Wire form 92 is provided in order to distribute any ground coffee which may form a bridge under plate 80 in section B.

A spring 84, stretched between a stud 85 which extends downwardly from disk 30 and a stud 86 which extends downwardly from extra strong drop plate 80, biases plate 80 toward the position shown in FIGURE 4, wherein plate 80 completely underlies opening 70. A solenoid S is mounted by a bolt 88 on a bracket 87 extending downwardly from disk 30, and a plunger P of solenoid S terminates in a yoke 89 which is linked to extra strong drop plate 80 by means of a pin 90 (see FIGURES 4 and 5). When solenoid S is energized, extra strong drop plate 80 is rotated in a counterclockwise direction (as seen in FIGURE 4), thereby causing end 83 thereof to move out from under opening 70. When, however, solenoid S is de-energized, spring 84 pulls the plate 80 back into the position shown in FIGURE 4 wherein plate 80 completely underlies opening 70.

The described arrangement of transport plate 50, wall 73, wall 73', cylinder 31, extra strong metering shutter 72, and extra strong drop plate 80 defines an extra strong metering chamber 91, the size of which may be adjusted by varying the position of extra strong metering shutter 72 as hereinbefore explained. The function and operation of extra strong metering chamber 91 will hereinafter appear.

An indexing switch (not shown) is attached to one of the projecting flanges 28 of base structure 24 by suitable means such as bolts 110 (see FIGURE 4). The indexing switch is provided with an actuating arm 111 terminating in a roller follower 112, and the actuating arm 111 extends into section C of base structure 24 such that roller follower 112 engages the outer edge of main drop plate 60 as it is rotatably driven by drive shaft 18. The indexing switch and actuating arm 111 are positioned such that, when cam surface 62 on main drop plate 60 engages roller follower 112, the switch will be actuated. The indexing switch functions in a conventional manner to dispose drive shaft 18, and hence agitator 47, transport plate 50, and main drop plate 60, in the proper angular position at the close of the operational cycle, as hereinafter described.

The operation of dispenser 11 may be described as follows. Motor shaft 18 is adapted to synchronously drive agitator 47, transport plate 50, and main drop plate 60 in a clockwise direction as viewed from the top. In the initial or start position, main drop plate 60 is disposed such that it underlies regular metering chamber 107 and such that product release cavity 63 is disposed adjacent thereto in a counterclockwise direction (as viewed from the top). Thus, when motor 16 is energized, cavity 63 moves beneath and opens chamber 107 shortly thereafter. Transport plate 50 is initially disposed such that transport cavity 52 is disposed beneath opening 48 in canister 40. Extra strong drop plate 80 is initially disposed in the position shown in FIGURE 4, i.e., plate 80 completely underlies extra strong metering chamber 91. In this initial or start position, transport cavity 52, extra strong metering chamber 91, and regular metering chamber 107 are all filled with ground coffee. Upon energization of motor 16 in response to a signal from a conventional control unit (not shown), drive shaft 18 causes agitator 47, transport plate 50, and main drop plate 60 to rotate in unison in a clockwise direction (as seen from the top) whereby product releasing cavity 63 revolves under regular metering chamber 107, thereby permitting the ground coffee disposed therein to fall downwardly under the influence of gravity through product releasing cavity 63 and slot 22 in supporting shelf 14 and further downwardly into a coffee transfer chute (not shown) adapted to direct the ground coffee into the brewing portion of the coffee vending machine (not shown) in which dispenser 11 is incorporated. The amount of coffee released in this manner corresponds to the volume of regular metering chamber 107. The volume of chamber 107, in turn, is dependent on the angular position of metering shutter 100. Thus, it is apparent that the amount of coffee to be released may be adjusted by varying the position of shutter 100 in the previously described manner.

Motor 16 continues to rotate and main drop plate 60 again revolves under regular metering chamber 107 so as to close the bottom thereof. At the same time main drop plate 60 begins its rotation, transport plate 50 also commences rotation so that transport cavity 52 revolves out from under opening 48 in canister bottom 43. Thus, cavity 52, which is filled with ground coffee, rotates in a clockwise direction (as viewed from the top) between disk 30 and canister bottom 43, and plate 50 is positioned such that cavity 53 passes over main metering chamber 107 after the bottom portion thereof has been closed by regular drop plate 60 (which occurs after the release therefrom of the predetermined charge of ground coffee). Thus, as plates 50 and 60 continue to rotate the ground coffee disposed in transport cavity 52 falls, under the influence of gravity, into regular metering chamber 107 until it is refilled with ground coffee. Plates 50 and 60 continue their rotation until they return to their respective initial positions wherein cavity 52 is disposed under opening 48 and coffee falls into cavity 52 in order to refill cavity 52. When plates 50 and 60 are thus disposed in their respective start positions, the indexing switch is adapted, in a conventional manner, to de-energize motor 16. The dispenser 11 may now be reactivated, as required. Throughout the rotation of plates 50 and 60, agitator 47 is rotated within canister 40 so as to agitate the ground coffee disposed therein. Thus, the dispenser 11 is adapted to release a predetermined metered amount of ground coffee according to a predetermined operational cycle. However, a unique provision of the subject invention permits an extra metered amount of ground coffee to be dispensed simultaneously with the aforementioned predetermined metered amount. It is for this reason that extra strong metering chamber 91 and its associated parts are provided. The operation of the dispenser 11 whereby the extra metered amount of coffee is dispensed is as follows. Transport plate 50 and main drop plate 60 are disposed in the previously described initial position. Motor 16 is energized and at the same time solenoid S is energized (in response to the customer's designation of an "extra strong" brew, by conventional means, not shown). Energization of solenoid S causes extra strong drop plate 80 to move out from under extra strong metering chamber 91 (plate 80 is shown in a partially opened position in FIGURE 6).

The opening of plate 80 serves to condition the release of the extra metered amount of ground coffee in the following manner. The ground coffee disposed initially in extra strong metering chamber 91 falls, under the influence of gravity, downwardly out of chamber 91 as plate 80 moves out from under opening 70. Simultaneously, cavity 63 in main drop plate 60 moves beneath the metering chambers 91 and 107 so that the coffee from chamber 91 as well as the coffee from chamber 107 is dispensed through cavity 63 and slot 22 in the previously described manner. Thus, the ground coffee disposed in extra strong metering chamber 91 and the coffee disposed in regular metering chamber 107 are simultaneously released through the slot 22 in supporting shelf 14. After the coffee is released, solenoid S is de-energized, and spring 89 returns the extra strong drop plate 80 to the position shown in FIGURE 4 wherein it completely underlies extra strong metering chamber 91. Continued rotation of transport plate 50 causes transport cavity 52 to pass over extra strong metering chamber 91 as well as over regular metering chamber 107, whereby both such chambers are refilled with ground coffee so as to be ready for another operational cycle. Motor 16 is de-energized when plates 50 and 60 are once again disposed in their initial position wherein transport cavity 52 underlies opening 48 thereby permitting cavity 52 to be refilled with ground coffee from canister 40.

Thus, in response to customer selection, dispenser 11 is adapted to release either a predetermined regular amount or a predetermined larger amount of ground coffee.

An important advantage of the subject invention is that the size of the predetermined amounts releasable from the regular metering chamber 107 and the extra strong metering chamber 91 are adjustable. This is accomplished, as previously described, by varying the angular position of either of the metering shutters 72, 100. For example, the described embodiment is designed such that the regular metering chamber may be adjusted to hold from 5.5 to 13.5 grams of coffee, and the extra strong metering chamber may be adjusted to dispense from 1.0 to 2.5 grams of coffee. Moreover, the metered amounts may be quickly and easily adjusted from outside the dispensing mechanism 11 by simply loosening the appropriate nut and moving the threaded shaft angularly in the proper opening in the cylinder 31. Thus, it is unnecessary to dismantle the entire dispensing mechanism 11 in order to adjust the size of the dispensing chambers.

As previously mentioned, a top (not shown) is provided to cover canister 40, and the top may be removed for replenishing the supply of ground coffee disposed within the canister 40 when the coffee brewer in which the dispenser 11 is incorporated is serviced.

While the subject invention has been described with particular reference to its utilization in a commercial coffee vending machine, it should be understood that the dispensing mechanism described herein may be utilized in many other environments in which a dry product dispensing unit is needed. As one obvious example, the principles of the subject invention could be utilized for the metered dispensing of powdered cream, sugar, etc. in vending equipment. It should be understood that various changes, modifications, and alterations may be effected in the details of construction and arrangement of the various elements, without departing from the spirit and the scope of the instant invention, as defined in the appended claims.

What is claimed is:

1. A dispensing mechanism adapted to release predetermined metered amounts of a dry product and comprising:
   storage means for storing the dry product;
   first metering chamber means adapted to hold a first predetermined metered amount of dry product;
   second metering chamber means adapted to hold a second predetermined metered amount of dry product;
   release conditioning means adapted, when actuated, to condition the release of the second predetermined metered amount;
   selectively operable means for actuating the release conditioning means;
   means adapted to release the first predetermined metered amount of the dry product, said means being further adapted to simultaneously release the second predetermined amount when the release thereof has been conditioned by actuation of said release conditioning means; and
   transport means for transporting dry product from the storage means to the first metering chamber means after the predetermined metered amount of dry product has been released therefrom so as to refill the first metering chamber means, the transport means also being adapted to transport dry product from the storage means to the second metering chamber means whenever the second predetermined metered amount of dry product has been released therefrom so as to refill the second metering chamber means.

2. A dispensing mechanism, as claimed in claim 1, and further comprising:
   means for adjusting the volume of the first metering chamber means so as to vary the size of the first predetermined metered amount; and
   means for adjusting the volume of the second metering chamber means so as to vary the size of the second predetermined metered amount.

3. A dispensing mechanism adapted to release predetermined metered amounts of a dry product and comprising:
   a base member having an opening therein;
   a storage canister adapted to store dry product and having an opening in the bottom thereof;
   means positioning the canister above the base member;
   a shaft journaled for rotation in the base member;
   a transport member mounted on the shaft for rotation therewith in between the canister bottom and the base member, a portion of the transport member being cut-away whereby, when the transport member rotates, the cut-away portion thereof revolves under the opening in the canister bottom and thereafter over the opening in the base member;
   a product releasing member mounted on the shaft for rotation therewith below the base member, a portion of the product releasing member being cut-away whereby, when the product releasing member rotates, the cut-away portion thereof rotates beneath the opening in the base member, the cut-away portions of the product releasing member and the transport member being indexed such that said cut-away portions are out of vertical alignment; and
   drive means adapted to rotate the shaft.

4. A dispensing mechanism, as claimed in claim 3, and further comprising means for adjusting the effective volume of the opening in the base member.

5. A dispensing mechanism adapted to release predetermined metered amounts of a dry product and comprising:
   a base member having a first opening and a second opening;
   a storage canister adapted to store dry product and having an opening in the bottom thereof;
   means positioning the canister above the base member;
   a shaft journaled for rotation in the base member;
   a transport member mounted on the shaft for rotation therewith in between the canister bottom and the base member, a portion of the transport member being cut-away whereby, when the transport member rotates, the cut-away portion thereof revolves under the opening in the canister bottom and thereafter over the first and second openings in the base member;
   a product releasing member mounted on the shaft for rotation therewith below the base member, a portion of the product releasing member being cut-away whereby, when the product releasing member rotates, the cut-away portion thereof rotates beneath the first and second openings in the base member, the cut-away portions of the product releasing member and the transport member being indexed such that said portions are out of vertical alignment;

a release conditioning member mounted on the base member for movement between a first position wherein the second opening in the base member is closed and a second position wherein said second opening is opened;

means normally biasing the release conditioning member toward its first position;

means for moving the release conditioning member from its first to its second position; and drive means adapted to rotate the shaft.

6. A dispensing mechanism, as claimed in claim 5, and further comprising:

means for adjusting the effective volume of the first opening in the base member; and means for adjusting the effective volume of the second opening in the base member.

7. A dispensing mechanism, as claimed in claim 5, wherein the shaft is also journaled for rotation in the canister bottom and further comprising an agitator member mounted on the shaft for rotation therewith inside the storage canister.

References Cited by the Applicant

UNITED STATES PATENTS

| | | | |
|---|---|---|---|
| 2,002,039 | 5/1935 | McPhee | 222—284 X |
| 2,259,710 | 10/1941 | Stern | 222—306 X |
| 2,944,707 | 7/1960 | Steinmetz | 222—284 |

ROBERT B. REEVES, *Primary Examiner.*

HADD S. LANE, *Examiner.*